UNITED STATES PATENT OFFICE.

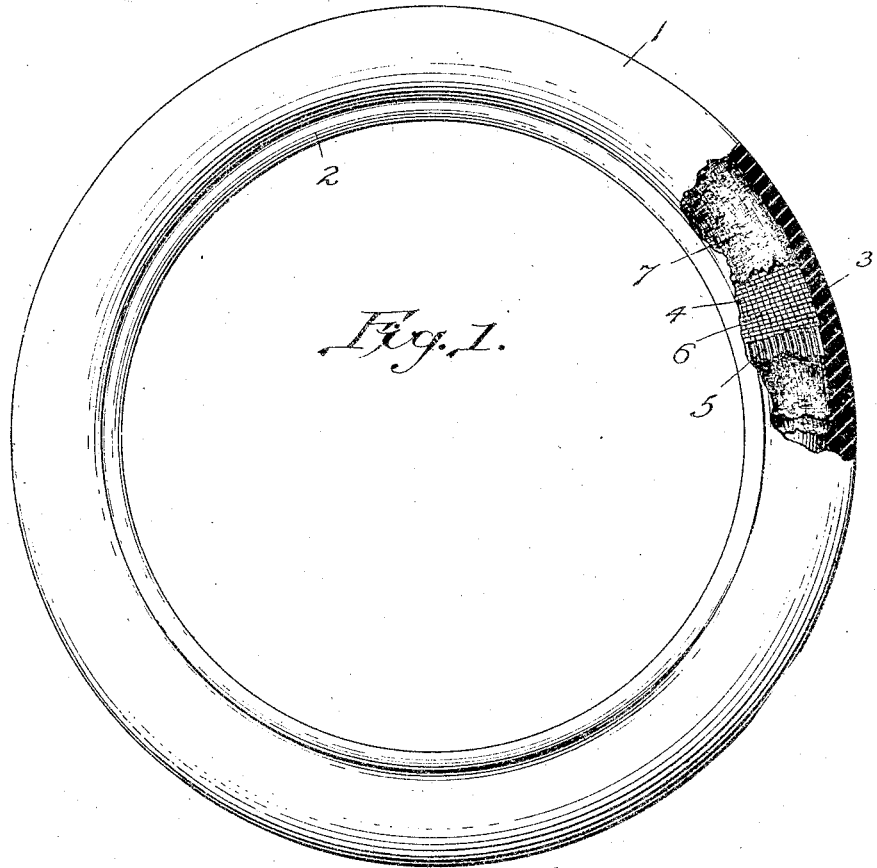
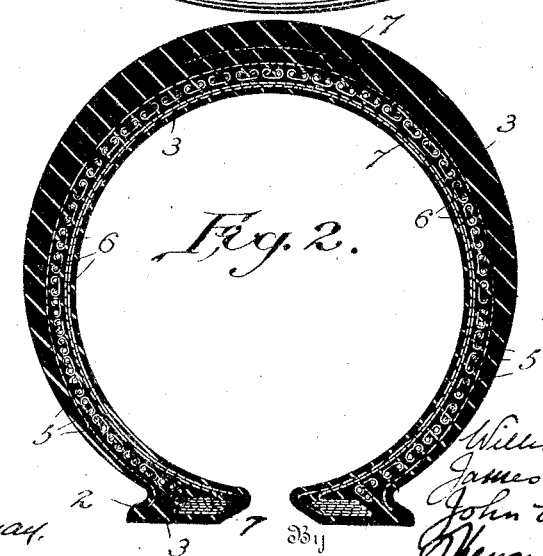

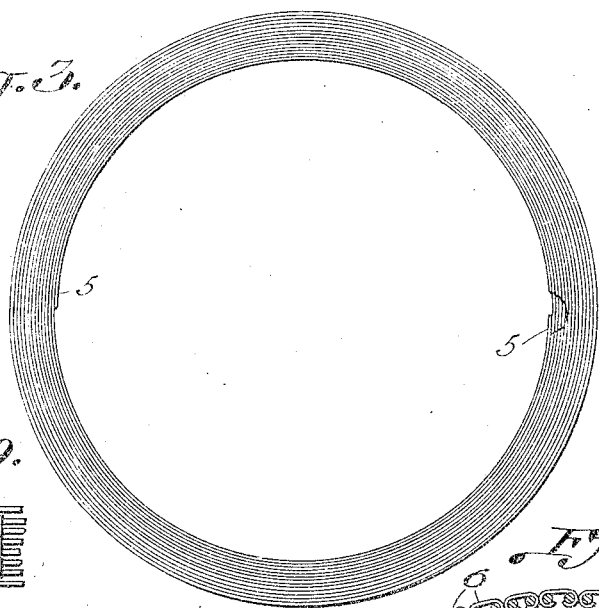
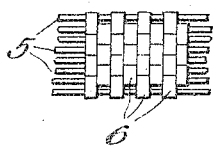
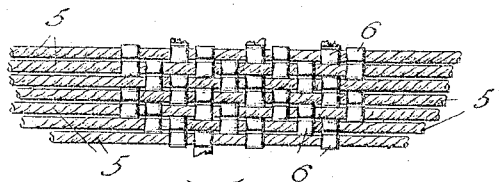
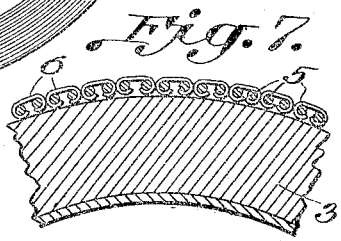
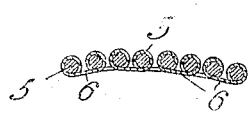
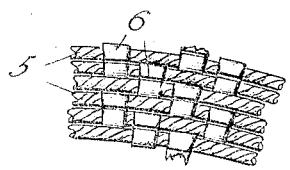

WILLIAM T. LUPTON AND JAMES McS. LUPTON, OF MARTINSBURG, WEST VIRGINIA, AND JOHN W. JOLLIFFE, OF CLEAR BROOK, VIRGINIA.

VEHICLE-TIRE.

1,212,973.   Specification of Letters Patent.   Patented Jan. 16, 1917.

Application filed January 28, 1914. Serial No. 814,994.

*To all whom it may concern:*

Be it known that we, WILLIAM T. LUPTON and JAMES McS. LUPTON, residing at Martinsburg, in the county of Berkeley, in the State of West Virginia, and JOHN W. JOLLIFFE, residing at Clear Brook, in the county of Frederick, in the State of Virginia, have invented new and useful Improvements in Vehicle-Tires, of which the following is a specification.

This invention relates to improvements in resilient tires and particularly to the construction thereof and means for reinforcing the same.

One object of the invention is to provide an armored pneumatic tire which will afford protection from all cuts and punctures.

Another object of the invention is to provide an armored pneumatic tire which will prevent rim cut troubles or blow-outs due to any cause.

Another object of the invention is to provide an armored pneumatic tire combining the resiliency of the pneumatic tire with the strength of an armored tire.

A further object of the invention is to provide an armor for tires in which the protective structure is pliable and so formed as to conform with every movement of the tire structure.

The invention also relates to certain details of construction which will be hereinafter more specifically described and claimed in the following specification and claims and illustrated in the accompanying drawings, in which, Figure 1 represents a side elevation of our improved tire with a portion broken away illustrating the interior construction. Fig. 2 is an enlarged transverse section of the tire. Fig. 3 is a view of the continuous wire structure used, illustrating the ends of the wire at opposite sides of the casing. Fig. 4 is a fragmentary view showing the staggeredly arranged hinge members spaced to avoid friction, one strand of wire separating adjacent hinge members. Fig. 5 is a view similar to Fig. 4, illustrating the wedge shape of the plates in the curve of the tire. Fig. 6 is an enlarged view of the cross section of the armor illustrating the depressed ends of the hinge members. Fig. 7 represents in section the armor as applied to the exterior of a tire casing for use as an exterior armor. Fig. 8 represents in section the use of the armor as an inner liner and used between the inner tube and the casing. Fig. 9 represents an enlarged view of the smooth side of the hinge members of the armor shown in Fig. 1, illustrating the hinge members abutting end to end and forming an approximately closed structure.

In referring to details of the drawings like numerals will be used to designate like parts.

1 represents a tire casing provided with a base and clencher bead 2. The rubber tread and other portion of the tire composed of rubber are designated by the numeral 3.

The structure of the tire 1 is built about the armor 4 which extends from one bead to the other (Fig. 2). In the preferred form the armor is constructed in the following manner: A single piece of wire rope 5, preferably provided with a fibrous center, is closely wound (Figs. 2 and 3) from one bead to the other, forming a large number of practically parallel metallic strands. Hinged members 6 cut from sheet metal are now used to hold in place the adjacent parallel strands. These plates or members are placed in staggered relation to each other against the inner side of the wires, the ends of the plates being recurved around adjacent wires, as illustrated in Figs. 2, 6 and 9, and depressed slightly. The member 6 may be of any length depending upon the size of the wire rope to be held and the width is depended on the general design of the tire, the desired flexibility and size, naturally increasing or decreasing with a diameter. It is advisable to cut the plates with the ends slightly smaller than the center so that the former when recurved around the wires will not be subject to frictional engagement with each other. Further, each plate on the side of the structure should be cut to slightly resemble a key-stone (Fig. 5), the sector like parts making up the arch of the circumference of the tire. One form of design for the armor consists in completely covering the wire surface with the protective hinges, in which case the members 6 abut against each other end to end, as in Fig. 1 and as enlarged in Fig. 9, the successive members on a wire strand extending in opposite directions to grasp the adjacent strand on either side. The numbers of hinges employed at the edge of the tire should be the same as that of the tread but it will be clear that the size of the former should be gradually increased as the tread is approached. Another design for the armor covering consists in skipping a wire strand, as shown in Figs. 4 and 5. It will be noticed from an inspection of these figures that the hinge members are separated longitudinally as well as laterally preventing any frictional heat which might be generated in the ordinary armored tire. After having constructed the armor 4 it may be made into a tire inner liner or protector, Fig. 8, adapted for use as an exterior armor, Fig. 7, or incorporated into a tire casing as an interior armor, as shown in Fig. 2 of the accompanying drawings. The structure 4 should be surrounded and impregnated with rubber 3, after which any desired number of layers of canvas 7 may be used and the tread, interior and base of the casing finished with rubber 3 to conform with the type of tread or rim specified.

As illustrated in Figs. 1 and 2 it will be observed that all the interstices of the armor 4 have been filled with the rubber 3. Two layers of canvas 7 are used within the structure and one on the outside, sufficient canvas being provided to properly strengthen the base and beads. An extra strip of canvas is placed in the tread for additional durability. The side walls of this tire may be as thin as desired since the danger of blow-outs is avoided by having the wire 5 extend down into the beads and base 2 (Fig. 2).

It will be clear from the foregoing that we have designed an armor for tires which is remarkably pliable and yet sufficiently strong to withstand any kind of usage, pressure from within or without, and blows or cuts of any nature. Armored tires generally have not been successful because of the shearing and grinding action of the armor on both rubber and canvas, due to rigid metal plates and heat generated between the parts. In the present design all parts move easily on one another and the whole structure is sufficiently soft to respond to the inflation of the inner tube. In the event of partial deflation of the tire, the hinged wires and members conform to the shape taken by the tire without having that tendency to force the metal parts through the rubber coating of the sides. All interstices of the armor are filled with the rubber and it will be clear that the rubber on either side of the armor may be connected through the spaces between the hinge members.

Changes in material used, in the location of the armor, shape and proportion of parts may be made without departing from the scope and spirit of the invention.

Having described our invention, what we claim as new and desire to secure by Letters Patent is, 1. A tire armor comprising substantially parallel wire strands and hinge members of sheet metal having their ends recurved about adjacent strands, said hinge members before application to said strands being formed with their ends of less width than the central portion thereof to provide space between the ends of adjacent hinge members for the prevention of friction when the structure is assembled.

2. A tire armor comprising substantially parallel wire strands and hinge members of sheet metal having their ends recurved about adjacent strands and closely embracing the same, said hinge members leaving open the space between the strands and the recurved ends of said hinge members on one side of said hinge members and forming a substantially smooth surface on the opposite side of the strands, the plurality of hinge members being arranged with all of the ends thereof on one side of the strands, the surface opposite thereto being composed of a plurality of the smooth central surfaces of each hinge member.

3. A tire casing provided with an armor embedded therein, comprising substantially parallel wire strands and hinge members of sheet metal having their ends recurved about adjacent strands and closely embracing the same, said hinge members leaving open the space between the strands and the recurved ends on one side of said hinge members and forming a substantially smooth surface on the opposite side of the strands, the plurality of hinge members being arranged with all of the ends thereof on one side of the strands, the surface opposite thereto being composed of a plurality of the smooth central surfaces of each hinge member.

4. A tire casing provided with a tire armor embedded therein comprising a single wire wound into a form substantially that of a pneumatic tire casing, the two ends of the wire being at opposite sides of the structure, and hinge members of sheet metal having their ends recurved about adjacent strands, successive members on one strand extending in opposite directions and recurved about the adjacent strand on either side to closely embrace the same and present a smooth surface on the inner side of said armor formed of a plurality of the smooth central portions of said hinge members, said hinge members before application to said strands being formed with their ends slightly reduced in width to provide space between said ends and prevent friction when the structure is complete.

In testimony whereof we have hereunto set our hands in the presence of two subscribing witnesses.

WILLIAM T. LUPTON.
JAMES McS. LUPTON.
JOHN W. JOLLIFFE.

Witnesses:
CHAS. A. YOUNG,
EDWARD RUTLEDGE.